(12) United States Patent
McMullan (10) Patent No.: US 7,344,171 B1
(45) Date of Patent: Mar. 18, 2008

(54) HAND-HELD DEVICE FOR PICKING UP OBJECTS

(75) Inventor: James McMullan, Spring Valley, CA (US)

(73) Assignee: IDM Worldwide L.L.C., Tempe, AZ (US)

( * ) Notice: Subject to any disclaimer, the term of this patent is extended or adjusted under 35 U.S.C. 154(b) by 180 days.

(21) Appl. No.: 10/804,345

(22) Filed: Mar. 19, 2004

(51) Int. Cl.
B25J 1/00 (2006.01)

(52) U.S. Cl. .................... 294/19.1; 294/902
(58) Field of Classification Search ........... 294/19.1, 294/902, 1.1
See application file for complete search history.

(56) References Cited

U.S. PATENT DOCUMENTS

| | | |
|---|---|---|
| 465,222 A | 12/1891 | Ulbricht |
| 1,120,735 A | 12/1914 | Moyer |
| 2,613,100 A | 10/1952 | Casey, Jr. |
| 3,527,492 A | 9/1970 | Hollis |
| 4,039,216 A | 8/1977 | Soos |
| 4,200,322 A | 4/1980 | Smith |
| 4,231,603 A | 11/1980 | van Zelm |
| 4,253,697 A | 3/1981 | Acosta |
| 4,398,759 A | 8/1983 | Manola |
| 4,466,649 A | 8/1984 | Ozawa |
| 4,483,562 A | 11/1984 | Schoolman |
| 4,613,179 A | 9/1986 | vanZelm |
| 4,615,555 A | 10/1986 | Bateham |
| 4,629,234 A | 12/1986 | Sokolowski |
| 4,647,094 A | 3/1987 | Bergkvist et al. |
| 4,669,769 A | 6/1987 | Polder, Jr. |
| 4,709,839 A | 12/1987 | Tucker |
| 4,758,035 A | 7/1988 | Shimasaki |
| 4,863,204 A | 9/1989 | Peters |
| 4,912,841 A | 4/1990 | Noschese |
| 4,938,516 A | 7/1990 | Temple |
| 4,949,961 A | 8/1990 | Milano |
| 4,962,957 A | 10/1990 | Traber |
| 5,042,861 A | 8/1991 | Trundle et al. |
| 5,154,465 A | 10/1992 | Pakosh |
| 5,174,300 A | 12/1992 | Bales et al. |
| 5,178,431 A * | 1/1993 | Voellmer .................... 294/86.4 |
| 5,192,104 A | 3/1993 | Lin |
| 5,232,256 A | 8/1993 | Forbes |
| 5,380,054 A | 1/1995 | Galvis |
| 5,458,385 A | 10/1995 | Peeples |
| 5,570,919 A | 11/1996 | Eusebe |
| 5,577,785 A | 11/1996 | Traber et al. |
| 5,590,923 A | 1/1997 | Berger et al. |
| 5,857,723 A | 1/1999 | Mathieu et al. |

(Continued)

Primary Examiner—Peter M. Cuomo
Assistant Examiner—Paul T Chin
(74) Attorney, Agent, or Firm—Young Basile (57) ABSTRACT

A hand-held device for gripping objects positioned beyond arm's length, comprising a pair of jaws movable relative to each other between an unclamped position and a fully clamped position; a handle spaced apart from the jaws by a central portion, the handle including a trigger connected to the jaws by a pull member, whereby actuation of the trigger is operative to move the jaws between the unclamped and fully clamped positions thereof, and a locking mechanism selectively operable to lock the jaws in at least one intermediate position defined between the unclamped and fully clamped positions; and wherein the pull member is sufficiently resilient so as to permit the jaws to be temporarily urged away from each other towards the unclamped position when the pair of jaws are locked in the at least one intermediate position.

12 Claims, 8 Drawing Sheets

U.S. PATENT DOCUMENTS

| | | | |
|---|---|---|---|
| 6,240,815 B1 * | 6/2001 | Huang | 269/6 |
| 6,684,465 B1 * | 2/2004 | Jo | 24/344 |
| 6,739,637 B2 * | 5/2004 | Hsu | 294/19.1 |
| 6,848,731 B2 * | 2/2005 | Khubani et al. | 294/19.1 |
| 6,874,833 B2 * | 4/2005 | Keith et al. | 294/19.1 |
| 7,004,520 B2 * | 2/2006 | Khubani et al. | 294/19.1 |

* cited by examiner

HAND-HELD DEVICE FOR PICKING UP OBJECTS

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

BACKGROUND OF THE INVENTION

The present invention is in the field of hand-held devices used for gripping or picking up objects. Such devices are often utilized by people having limited mobility. Such devices are also frequently used by anyone who desires to simply increase his or her range for grasping or holding objects.

Hand-operated remote gripping, grappling, and grabbing devices have been around for ages. The array of devices that have been invented to achieve this singular purpose are both numerous and diverse. Indeed, inventions drawn toward achieving this object include everything from the most mundane pair of kitchen tongs all the way to the most elaborate of grapples, seemingly incorporating every manner of mechanical and dexterous advantage for accomplishing highly specialized tasks related to remote manual gripping.

This field is broad and diverse enough that it is possible to categorize prior inventions in a variety of ways. Among the most conventional gripping devices are those that convert some variation of the conventional "trigger" action into some form of gripping or grasping action in a way that often mimics the action and dexterity found in the human opposable thumb and forefinger. Such devices commonly operate at a distance on the order of a few feet, and frequently on a single line of action. Even within this seemingly simple and straightforward class of devices, inventors have employed a great variety of mechanical means for achieving the stated task.

Beyond this mainline class of gripping devices are several others that are distinguishable by virtue of enhancements to articulation or dedication to specific tasks. In the former category are inventions having multiple joints, making the devices adaptable to and operable in situations calling for remote manual gripping in locations where certain known obstacles present difficulties to a single line of action. Other devices in this group have modular or interchangeable actuators. Others provide members for enhancing the stability of the conventional trigger or hand grip user interface. Still others in this category offer the benefit of adjustable length. The latter category of gripping devices, those dedicated to specific tasks, encompasses remote gripping devices designed for dedicated uses such as picking up dead animals, grasping cables, retrieving cans, pulling weeds, extracting light bulbs, grasping worms, gripping shoes, picking up animal waste, and lifting stones.

Both within and without these categories, many remote manual gripping devices have incorporated mechanisms for locking the jaws or other actuators in various positions ranging from fully opened to fully closed. Although the specific geometries differ widely, these mechanisms almost universally employ some variation of a simple ratchet arrangement. Unfortunately, these devices also universally suffer from one of two maladies. In some devices, the locking mechanism is so delicate as to easily wear out after repeated uses. In other devices, portions of the locking mechanism remain in physical contact with the primary activation mechanisms. These locking mechanisms thus continue to wear even when not in use for locking purposes.

For all of the diversity and innovation that has taken place in this field, many of the devices are simply over-engineered or cumbersome. In addition to the shortcomings found among locking mechanisms, other devices require the use of two hands, some provide little or no mechanical advantage, and many are simply poorly designed for prolonged and repeated use. Thus, there is a need for a simple yet robust remote manual gripping device that can truly stand the test of time.

BRIEF SUMMARY

The specification discloses a hand-held device for gripping objects positioned beyond arm's length, comprising: At least a first pair of jaws movable relative to each other between at least an unclamped and at least a first clamped position thereof; a handle spaced apart from the at least first pair of jaws by a central portion, the handle including a moveable trigger connected to the at least first pair of jaws, whereby movement of the trigger is operative to selectively position the at least first pair of jaws between the unclamped position and a fully closed position thereof, and a locking mechanism operative to selectively lock the at least first pair of jaws in the at least first clamped position thereof. The locking mechanism comprises a lock lever including a cam surface, the lock lever selectively moveable between a first position, wherein the lock lever is engaged with the trigger to limit movement thereof, and a second position, wherein the lock lever is disengaged from the trigger to permit unlimited movement thereof, and wherein further the lock lever is biased to the first position thereof, and a manually operable switch having a cam following portion which, by selective movement of the switch, is positionable along the cam surface of the lock lever to effect movement of the lock lever between the first and second positions thereof.

According to a further feature of this invention, a series of notches are provided on one of the lock lever or trigger and a corresponding tab is provided on the other of the lock lever or trigger, wherein the notches and tab cooperate when the lock lever is in the first position.

Per another feature hereof, the trigger and the at least first pair of jaws are connected by a resilient linking member. According to yet another feature of the present invention, the resilient linking member comprises a rod having a spring section provided along the length thereof.

In still another feature hereof, the at least first pair of jaws are selectively rotatable relative to a longitudinal axis of the device defined between the handle and the at least first pair of jaws.

According to a further feature of this invention, the central portion terminates in a seating surface, and the at least first pair of jaws include an opposing end surface which is seatable upon the seating surface of the central portion, and wherein the at least first pair of jaws are rotatable relative to the seating surface of the central portion, and wherein further the seating surface of the central portion and the opposing end surface of the at least first pair of jaws include one or the other of complementary tab and recess portions, the complementary tab and recess portions engageable to define at least a first rotational position of the at least first pair of jaws relative to the longitudinal axis of the device. A plurality of the complementary tab and recess portions are radially spaced about the end surface of the at least first pair of jaws and the seating surface of the central portion to thereby define a plurality of rotational positions of the at least first pair of jaws relative to the longitudinal axis of the device.

Per still a further feature of this invention, each of the at least first pair of jaws includes a gripping portion removably connected thereto. Each gripping portion comprises an upper part having opposite gripping and seating surfaces, and a stem part extending axially from the upper part, the stem part including at least one radially extending tab, and wherein further each of the at least first pair of jaws includes a blind bore dimensioned to receive therein the stem part, including the tab, the bore opening adjacent an upper surface opposing the seating surface of the gripping portion upper part, and the bore further communicating with a radiused slot dimensioned to receive therein the tab of the stem part to thereby permit rotational movement of the gripping portion relative to the jaw.

The seating surface of each gripping portion may include at least one detent, and the upper surface of each of the at least first pair of jaws includes a complementary recess positioned at the limit of rotational movement of the gripping portion relative to the jaw.

According to an even further feature hereof, the trigger includes a stop portion, and the handle includes an opposing surface against which the stop portion abuts to define a limit to the range of motion of the trigger in a first direction. At least a first recess may also be defined below the stop portion, the at least first recessed area dimensioned to accommodate the index finger of a user.

BRIEF DESCRIPTION OF THE DRAWINGS

The present invention may be better understood with reference to the drawings, of which:

FIG. 3c is an enlarged side elevational cutaway view of the interior of the gripping assembly taken along line 3c of FIG. 3a;

DETAILED DESCRIPTION

Referring now to the drawings, wherein like numerals indicate like or corresponding parts through the several views, the present invention will be seen to comprise most generally at least a first pair of jaws movable relative to each other between an unclamped and at least a first clamped position, a handle spaced apart from the at least first pair of jaws by a central portion, the handle including a movable trigger connected to the at least first pair of jaws, whereby movement of the trigger is operative to selectively position the at least first pair of jaws between the unclamped position and fully closed position, and a locking mechanism operative to selectively lock the at least first pair of jaws in the at least first clamped position thereof. The locking mechanism comprises a lock lever, including a cam surface, the lock lever selectively movable between a first position, wherein the lock lever is engaged with the trigger to limit movement, and a second position, wherein the lock lever is disengaged from the trigger to permit unlimited movement, and wherein further the lock lever is biased to the first position; and a manually operable switch having a cam following portion which, by selective movement of the switch, is positionable along the cam surface of the lock lever to effect movement of the lock lever between the first and second positions.

As used herein, the term "clamped" refers simply to the condition wherein an object is grasped between the at least first pair of jaws. As such, the term "clamped" is not to be construed to require complete closure of the at least first pair of jaws.

Figure 1:
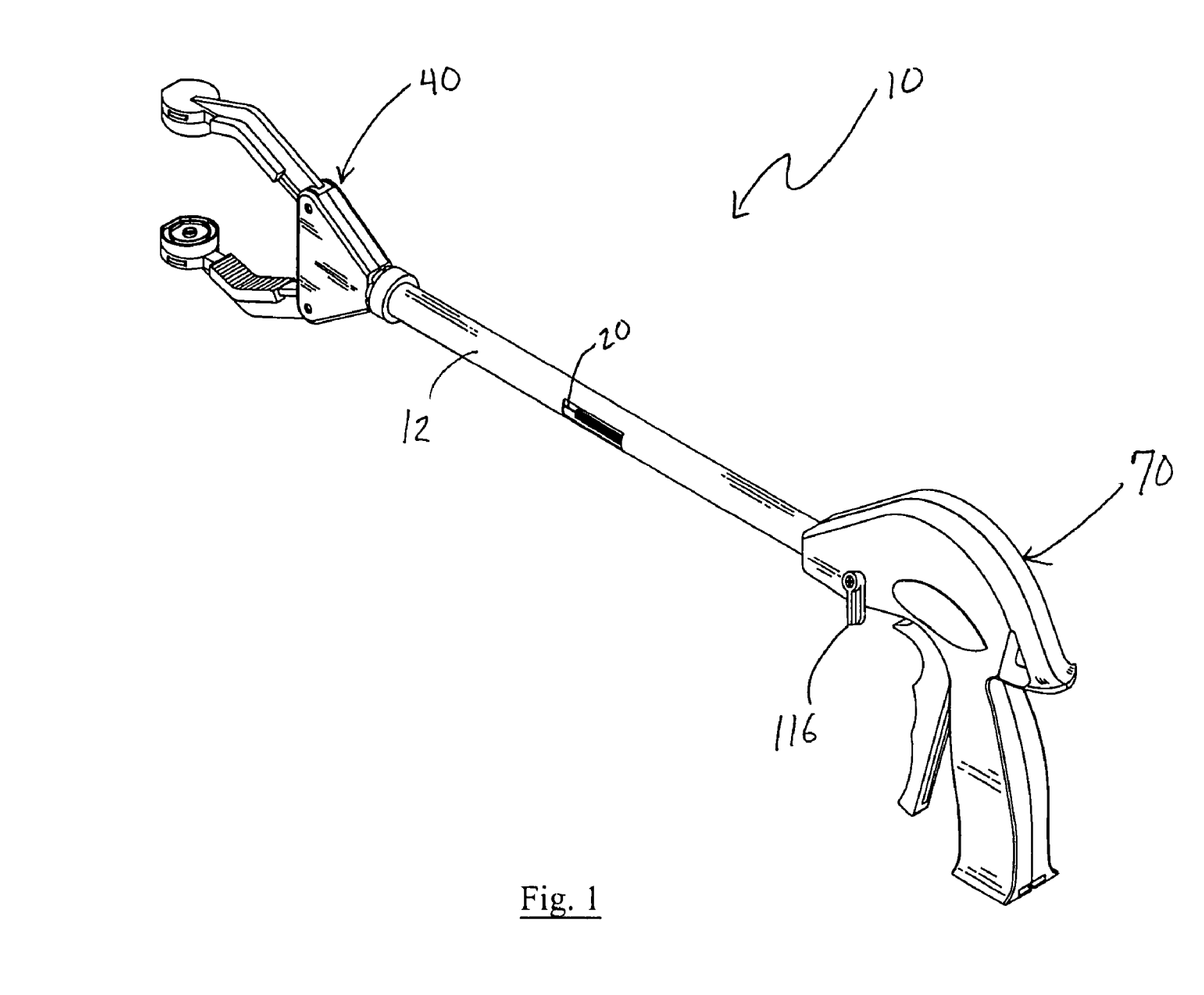
FIG. 1 depicts an isometric view of the present invention.
Figure 2:
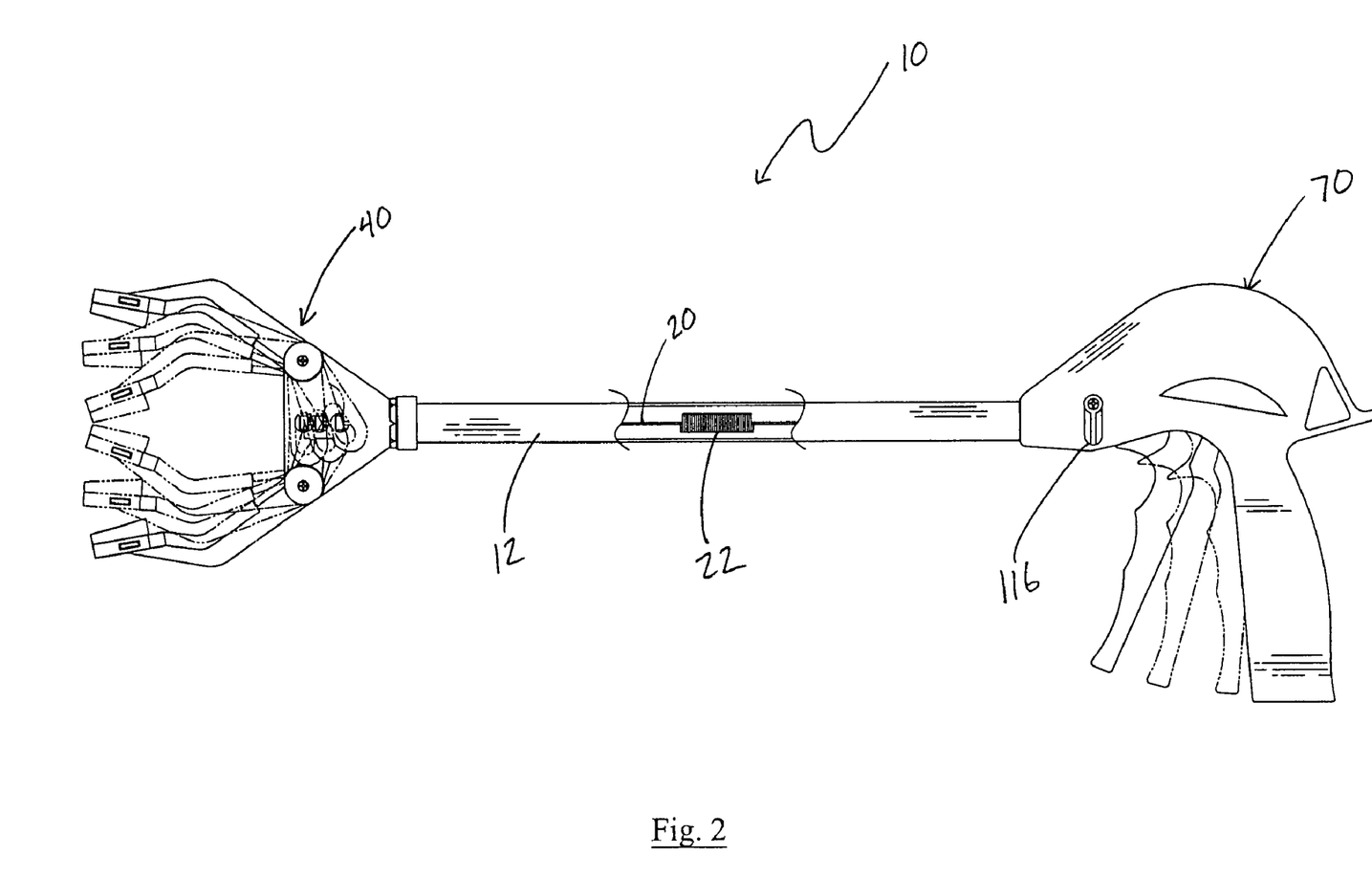
FIG. 2 is a partially cutaway side elevational view of the present invention depicting the operation of the trigger and jaws.

Turning to FIGS. 1 and 2, a hand-held device for gripping objects positioned beyond arm's length is described. The hand-held device for gripping objects 10 has three major portions. The first portion is a central portion 12. A rod 20 is enclosed within and coaxial with central portion 12. The rod 20 is the primary member in achieving operable connectivity between a handle assembly 70 and a gripping assembly 40. The gripping assembly 70 is operatively attached to the distal end of the central portion 12. The connection between the gripping assembly 70 and central portion 12 is further described below. Finally, the handle assembly 40 is connected to the proximal end of portion 12. The handle assembly 40 and portion 12 may be connected by any conventional means such as epoxies or glues, one or more screws, pins, friction, any of these in combination, or other fasteners known in the art.

Figure 3A:
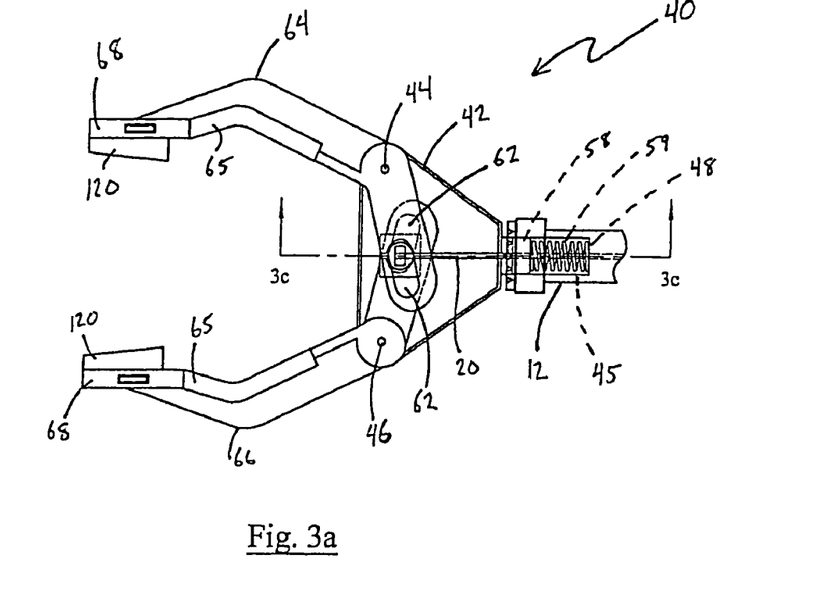
FIG. 3a depicts a side elevational and partially cutaway view of the gripping assembly.
Figure 3B:
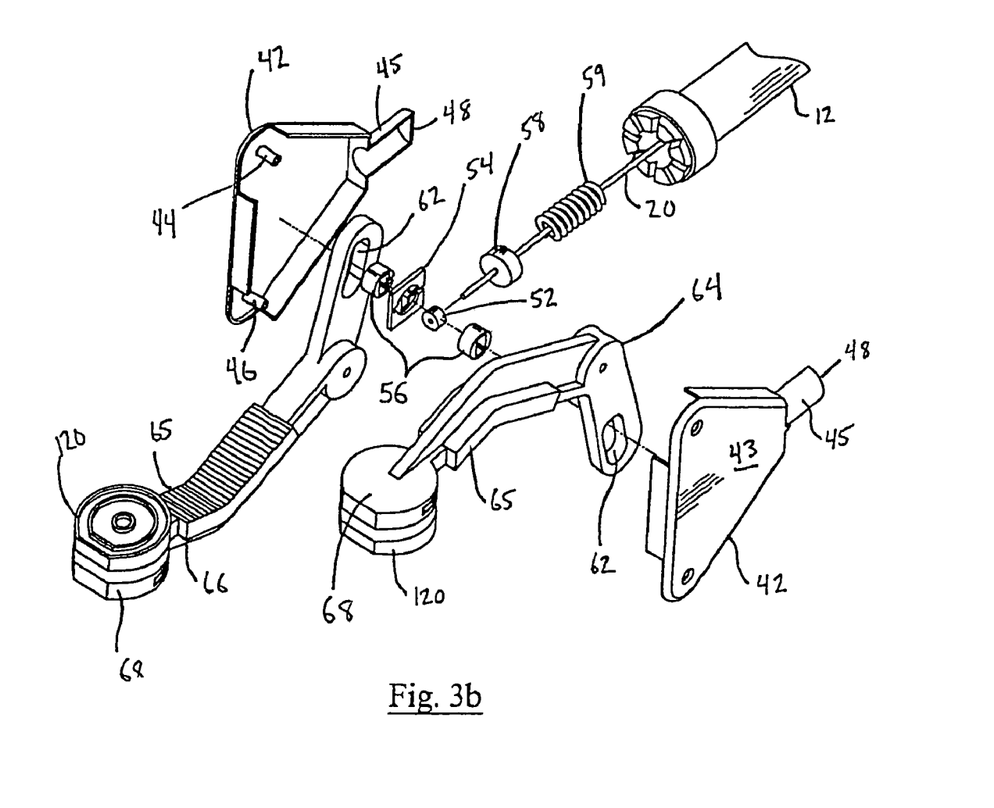
FIG. 3b depicts an isometric and partially exploded view of the gripping assembly.

Turning now to FIGS. 3a and 3b, a pair of jaws 64 and 66 movable relative to each other between at least an unclamped and at least a first clamped position is disclosed. Gripping assembly 40 features a housing 42 that may be made in two pieces. The housing has a trapezoidally shaped base portion 43 and a neck portion 45. The base 43 and neck 45 portions of housing 42 may be constructed as one piece or in multiple parts. The neck portion 45 of gripping assembly housing 42 is generally cylindrical in shape. Neck portion 45 should be small enough in exterior diameter to be received within the end of central portion 12. The neck portion 45 terminates in stop 48. A hole of sufficient diameter to allow passage of rod 20 is provided in stop 48. The narrower end of trapezoidally shaped base portion 43 is connected to the neck portion 45.

The side walls of base portion 43 are cutaway at the corners of its wide end. First pivot post 44 and second pivot post 46 are mounted near these wide end corners of base portion 43. The first jaw 64 and second jaw 66 are respectively mounted to first and second posts 44 and 46. Jaws 64 and 66 are each provided with holes adapted to engage pivot posts 44 and 46. Portions of jaws 64 and 66 extend outwardly away from housing 42 and each terminates in an end effector 68. It will be appreciated that exterior portions of jaws 64 and 66 may be configured in a variety of ways. The configuration of these portions as depicted throughout the drawing figures are generally suitable for multiple purposes. In this embodiment, jaws 64 and 66 are provided with rubberized grips 65 having abraded surfaces. In addition, end effectors 68 are provided with gripping portions 120. As will be apparent to those having skill in the art, jaws 64 and 66 and the associated components may be constructed in a variety of ways to accomplish specialized or dedicated tasks.

Portions of jaws 64 and 66 also extend inwardly into housing 42. These interior portions of jaws 64 and 66 are each reduced more than halfway in thickness and interleaved to achieve an overlapping configuration inside of housing 42. These interior portions are further provided with slots 62. Slots 62 of the interleaved jaws 64 and 66 cooperate to define an opening therebetween. A carriage assembly is disposed within this opening.

Figure 3C:
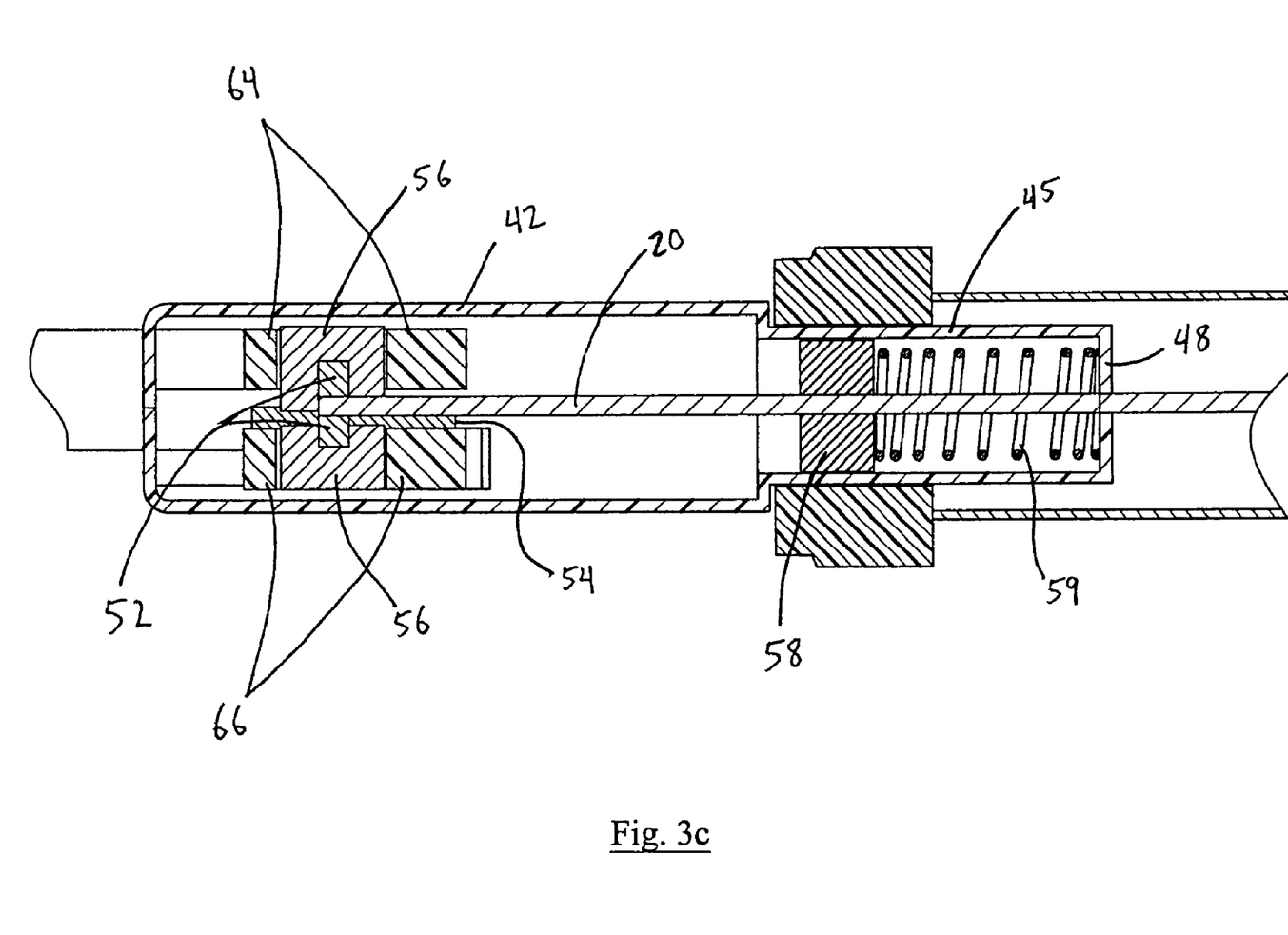

As can be seen in reference to FIGS. 3b and 3c, the carriage assembly consists of pull rod end-boss 52, rack 54, and lug 56. End-boss 52 is secured to rod 20 by a recessed set screw or other conventional device known in the art. Rack 54 contains a central recessed portion to accommodate the rod 20 and lug 56. A rectangular aperture is provided through the center of this recessed portion to accommodate end-boss 52. Lug 56 may be constructed in one or two pieces. If constructed of one piece, it is disposed entirely through the central portion of rack 54. If the lug 56 is composed of two pieces, these may be affixed to rack 54 with solder, epoxy, or the like. Lug 56 is also provided with a substantially rectangular aperture to accommodate end boss 52. The apertures in rack 54 and lug 56, as well as the recessed portion in rack 54 to accommodate rod 20 should be sized to allow the free rotation of end boss 52 and rod 20 when fully assembled. Lug 56 cooperates with the slots 62 defining the opening to complete the mechanical connection between jaws 64 and 66 and rod 20.

A second boss 58 is attached to rod 20 at a sufficient distance away from end boss 52 to dispose second boss 58 within neck portion 45 of housing 42. A helical spring 59 is disposed within neck portion 45 of housing 42 coaxial with rod 12 and abutting boss 58 on one end and stop 48 of housing 42 at its other end. Boss 58 is secured to pull rod 20 by any conventional means as with boss 52.

Figure 4A:
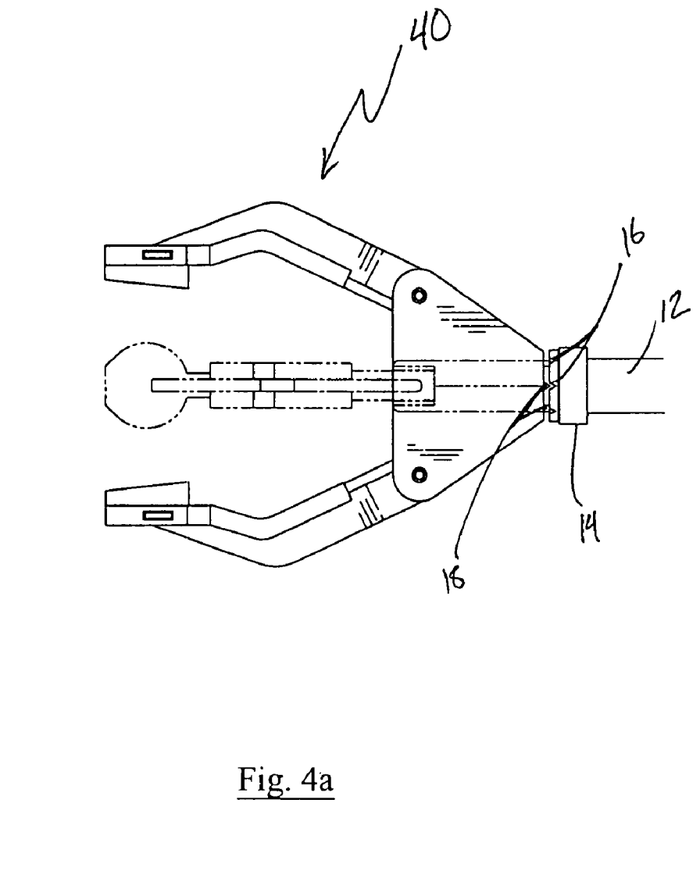
FIGS. 4a and 4b are side elevational views of the gripping assembly depicting the rotational feature of that assembly.
Figure 4B:
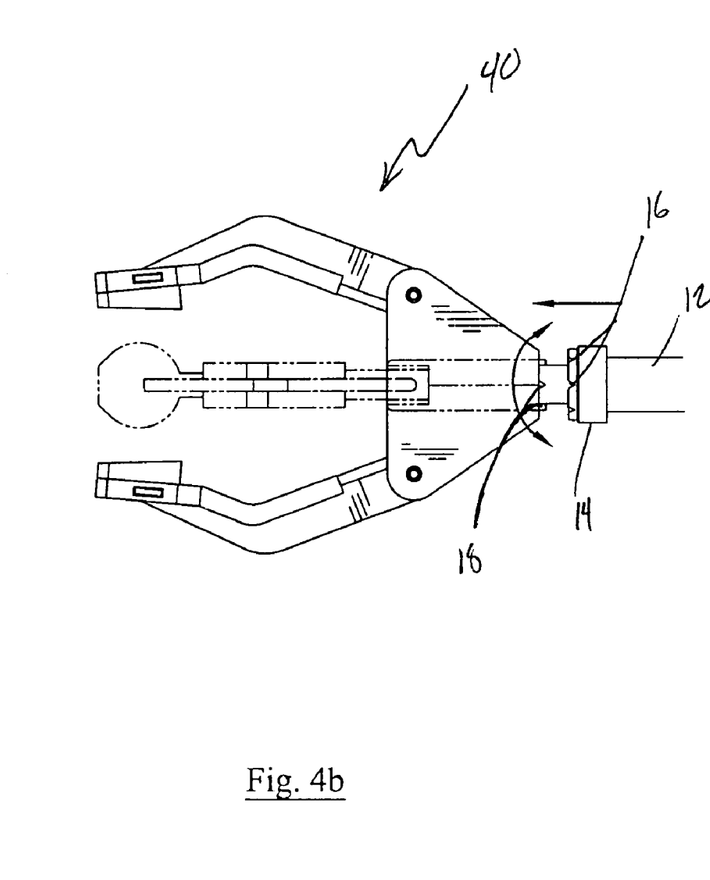

Turning now to FIGS. 4a and 4b, the selective rotation of the jaws 64 and 66 relative to a longitudinal axis of the device defined between the handle assembly 70 and jaws 64 and 66 is described. It will be seen that the gripping assembly 40 resides at the distal end of central portion 12. Specifically, the distal end of central portion 12 receives the neck portion 45 of housing 42 of the gripping assembly 40. A seating surface 14 is attached to distal end of central portion 12. The seating surface 14 may be attached to central portion 12 by any conventional means as have already been mentioned, provided that surface 14 is fixed and not free to rotate with respect to central portion 12. A series of recess portions 16 are provided on the end face of surface 14. Correspondingly, a series of tabs 18 are provided on the shoulder at the juncture of neck portion 45 and base portion 43 of gripping assembly housing 42. The arrangement and operation of this interface is further detailed below.

Figure 5A:
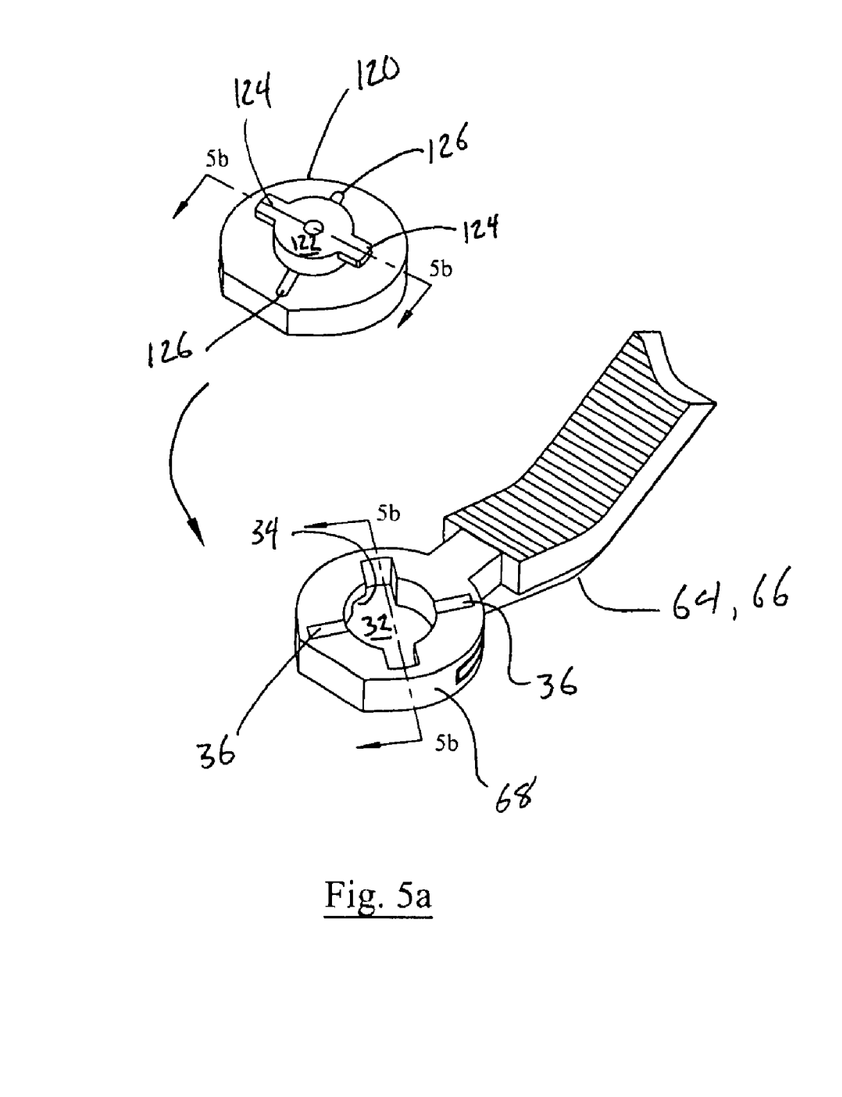
FIG. 5a is an enlarged isometric view of the removable gripping surface of the present invention.
Figure 5B:
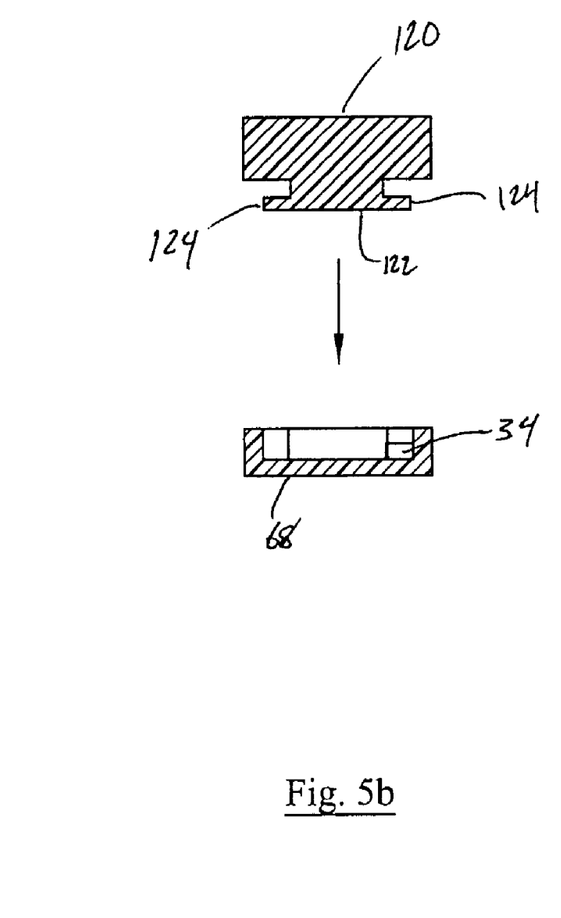
FIG. 5b is a side elevational cutaway view of the removable gripping surface of the present invention.

Turning now to FIGS. 5a and 5b, it can be seen that each of jaws 64 and 66 includes a gripping portion 120 removably connected thereto. In this particular embodiment, end effector 68 is substantially hollow and provided with female locking interface portions. Specifically, end effector 68 has a bore 32 with adjoining radiused slots 34. In addition, the seating surface of end effector 68 is provided with recesses 36. Gripping portion 120 is provided with the corresponding male interlocking interface portions. These are a stem 122, tabs 124, and detents 126. The mating of gripping portion 120 with end effector 68 is achieved through the insertion of stem 122 of gripping portion 120 into bore 32 of effector 68. Tabs 124 of gripping portion 120 initially fit the corresponding geometry of bore 32, however, gripping portion 120 is not fully seated in this orientation. A user would further twist gripping portion 120 in a counterclockwise fashion until tabs 124 fully engage radiused slots 34, and detents 126 are fully seated in recesses 36. An improved mating may be achieved if one or both of the interfacing materials is slightly resilient. It will also be appreciated that end effectors 68 and gripping portions 120 may be made in a variety of shapes and sizes, and it is not necessary that the working surfaces of gripping portions 120 correspond in shape or size to end effectors 68. Thus, a variety of removable portions with specialized or dedicated working surfaces may be alternatively engaged with the mating surface provided by end effectors 68.

Turning at last to FIGS. 6a to 6d, the figures show the handle assembly 70 including a moveable trigger 80 connected to jaws 64 and 66, whereby movement of trigger 80 is operative to selectively position jaws 64 and 66 between the unclamped position and fully closed position thereof, and a locking mechanism operative to selectively lock jaws 64 and 66 in a first clamped position thereof. Handle assembly 70 is provided with housing 72 which connects to the proximal end of central portion 12. As described above, the housing 72 may be attached to the central portion 12 by any means known in the art. The housing is generally made from two mirrored mating halves. Housing 72 provides a trigger pivot shaft 74, a lock arm pivot shaft 76, and a cam shaft mounting hole 78. Also prominent on housing 72 is hand grip 90.

Trigger 80 is pivotally mounted to trigger pivot shaft 74 of housing 72. Trigger 80 is further connected by way of a rod connector 84 to rod 20. The forward range of motion of trigger 80 is limited by a forward stop portion 82 which abuts against an opposing surface of housing 72. The portion of the trigger 80 interior to housing 72 is substantially hollow to accommodate the pull rod connector, locking tab 86, and lock lever 100, which requires free movement within the hollow portion of trigger 80. The aft range of motion of trigger 80 is limited in one mode by the interface of trigger-mounted tab 86 with the most rearward of the trigger interface notches 106 on lock lever 100. Alternatively, in a second mode, the aft range of motion of trigger 80 is limited by the hand grip 90.

Provided below the stop portion 82 is at least a first recess dimensioned to accommodate the index finger of a user. As will be appreciated from FIGS. 6a and 6b, this recess, in combination with the stop portion 82, serves to prevent a user's index finger, or any part thereof, from being caught or pinched between the trigger 80 and the housing 72.

It will further be appreciated that the stop portion 82, by increasing the area of the trigger 80, serves to strengthen the trigger by reducing the amount of force per given area applied thereto when the trigger is operated.

The locking mechanism of the hand-held gripping device features lock lever 100 which is mounted on lock arm pivot shaft 76 of housing 72. The proximal end of lock lever 100 is attached by way of spring 108 to housing 72. The distal end of lock lever 100 interfaces with cam roller 110 and its associated assembly. The distal end of lock lever 100 features a variable geometry interface consisting of a first cam seat 102, a second cam seat 104, and a cam seat divider 103. Interfacing with this geometry is cam follower 110, which is attached by way of cam arm 114 to lateral camshaft 112. Cam follower 110 is preferably, though not necessarily, rotatably disposed on the cam arm 114, by which arrangement less wear of the cam follower 110 results and, moreover, the cam follower 110 is more easily moved between the at least first 102 and second 104 cam seats. Lateral camshaft 112 is pivotally mounted to housing 72 by way of the camshaft mounting hole 78. At least one end of the lateral camshaft is exposed to the exterior of housing 72. Toggle arm 116 is connected to the exposed end of lateral camshaft 112 by any means.

Figure 6A:
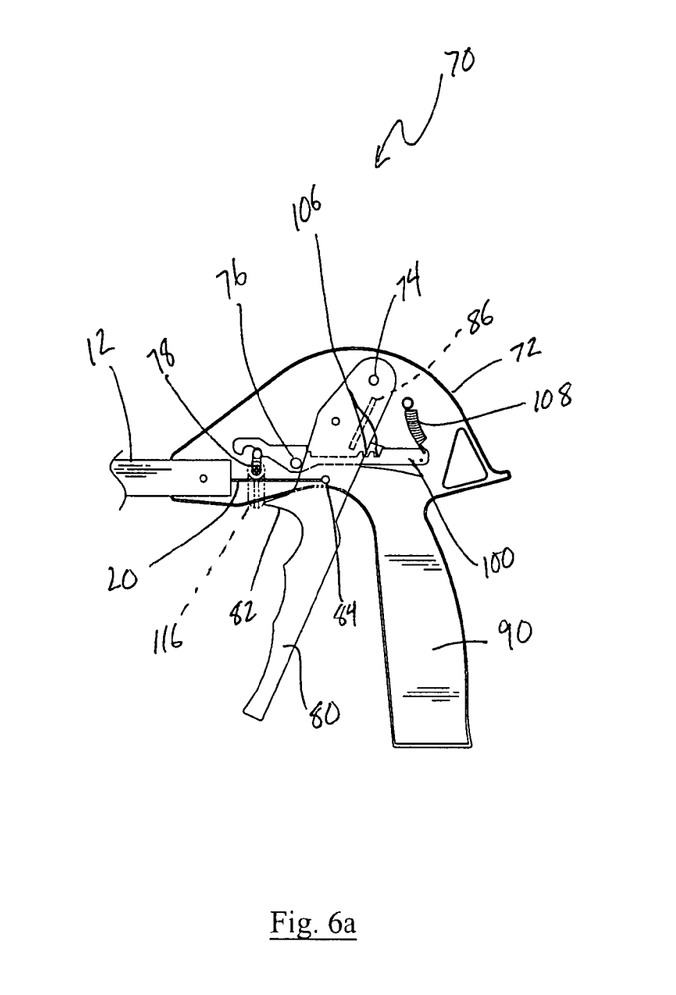
FIGS. 6a and 6b depict the interior of the handle of the present invention in various operational states.
Figure 6B:
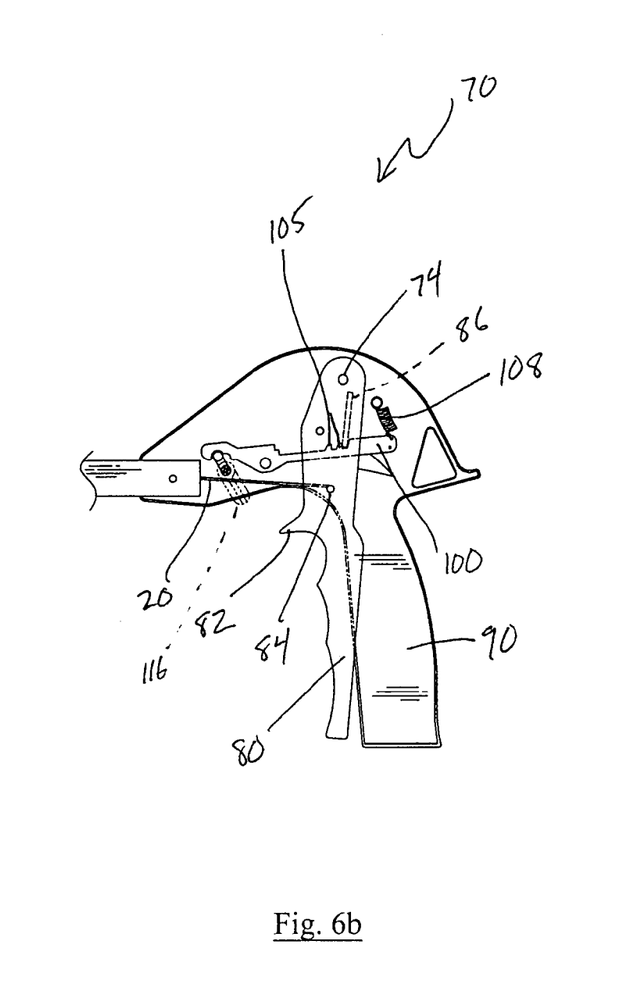
Figure 6C:
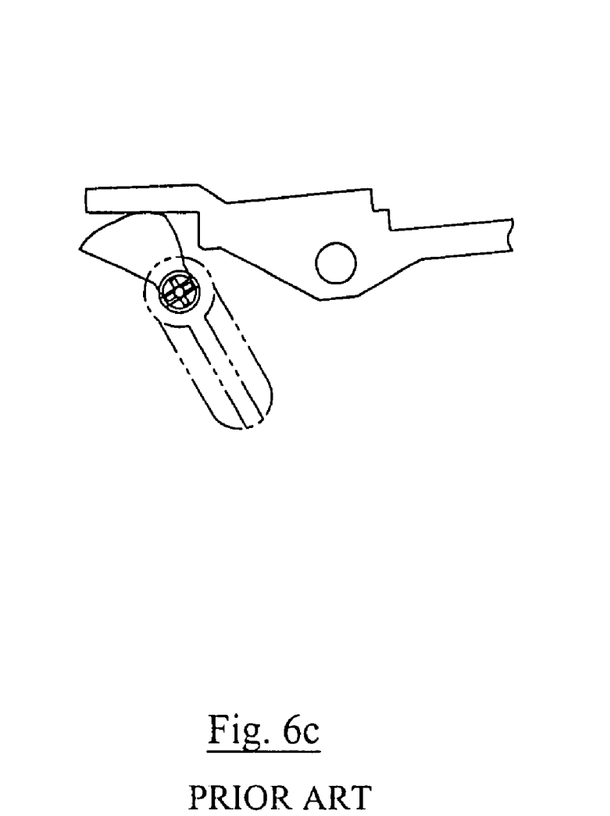
FIG. 6c depicts prior art.
Figure 6D:
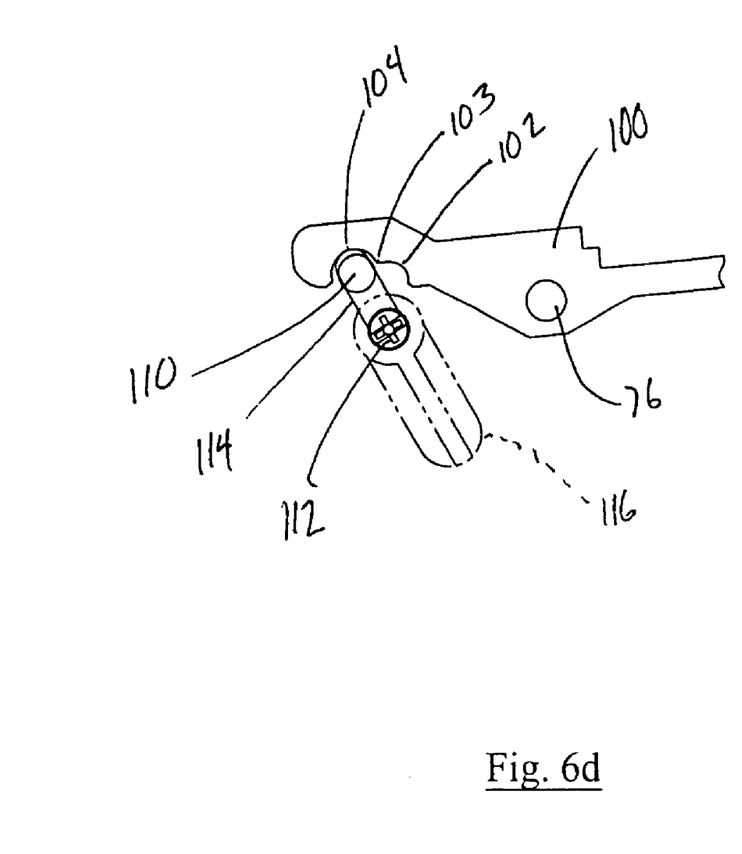
FIG. 6d is an enlarged cutaway view of a portion of the locking assembly of the present invention.

The present invention is used in one of two primary modes. The first mode could be considered a conventional gripping mode where the locking mechanism is in the disengaged position. The second mode could be considered a grip-lock mode wherein the device is operated with the locking mechanism in an engaged position. The modes are switched by use of the toggle arm 116. The motion of the toggle arm 116 effects a rotation of the lateral camshaft 112 resulting in a displacement of cam arm 114 and cam follower 110. The particular geometry of the first and second cam seats 102 and 104 on lock lever 100 along with the intervening cam seat divider 103 provides for an essentially binary positional arrangement of cam follower 110 with respect to lock lever 100. The cam follower 110 is disposed to rest in either the first cam seat 102 or the second cam seat 104. The cam seat divider 103 creates an instability in its interface with cam follower 110 and thus urges the follower to rest in either seat 102 or seat 104. Since the cam follower 110 may only be toggled between these two positions, the toggle arm 116 is similarly disposed to have only two positions. The toggle arm 116 thus behaves as a switch that results in one of two predetermined positions for lock lever 100 with respect to trigger tab 86. When cam follower 110 is at rest in first cam seat 102, the trigger interface notches 106 of lock lever 100 are displaced away from tab 86 on trigger 80 by virtue of the pivotal restriction on lock lever 100 provided by the lock lever pivot shaft 76 on housing 72. When the user toggles cam follower 110 to the second cam seat 104, spring 108 serves to draw the proximal end of lock lever 100 and the associated trigger interface notches 106 to a position where those notches will come into contact with trigger tab 86 if the trigger 80 is displaced a sufficient distance.

In the first mode, the user first operates toggle arm 116 to its forward position, displacing cam follower 110 to first cam seat 102. The user then grasps the present invention by fitting the hand grip 90 and trigger 80 into the palm and fingers of his hand. When the user flexes his fingers to draw the trigger 80 toward hand grip 90, trigger 80 pivots freely on trigger pivot shaft 74 and the rod connecting pin 84 serves to transmit the displacement of the trigger to the rod 20. Returning now to FIGS. 3a and 3b, when the pull rod 20 is drawn toward the proximal end of the device, the rod end boss 52 serves to displace carriage assembly 50. As the carriage assembly 50 traverses in linear fashion in the proximal direction of the device, the lug 56 of carriage assembly 50 traverses the interleaved slots 62 of jaws 64 and 66. This displacement of the interior portions of jaws 64 and 66 is further restricted by pivot posts 44 and 46, thus effecting a rotation of jaws 64 and 66 around respective pivot posts 44 and 46. Jaws 64 and 66 are thus drawn toward each other.

The displacement of rod 20 similarly displaces second boss 58. This boss serves to compress spring 59 between itself and stop 48 in the neck portion 45 of housing 42. Thus, the user must pull the trigger with sufficient force to overcome the opposing force created by the compression of spring 59 between boss 58 and stop 48. When the user relaxes his grip on trigger 80, the residual force in spring 59 serves to displace boss 58, and thereby rod 20, in a distal direction. The displacement of the rod 20 caused by spring 59 is limited by the positive stop 82 provided on trigger 80 when the stop 82 abuts the housing 72 of the handle assembly 70. Thus, when the device is at rest, the jaws 64 and 66 are biased toward an open orientation, and the trigger is biased to its foremost position. In this first mode of operation, the user's displacement of trigger 80 therefore achieves a proportional displacement of jaws 64 and 66. The user is thus able to achieve an extension of his gripping ability to the distance provided by the length of the central portion 12.

The second mode of operation for the device is achieved when the cam follower 110 is moved to rest in the second cam seat 104 by way of toggle arm 116. In this mode, when the user grips and displaces trigger 80, tab 86 on the trigger contacts a first tooth 105 in advance of the first trigger interface notch 106. The slightly rounded geometry of the tooth 105 allows the tab 86 to urge lock lever 100 underneath tab 86, and tab 86 eventually seats itself in the first trigger interface notch 106 due to the urging of spring 108 on lock lever 100. The forward travel of the trigger 80 and rod 20 thus becomes limited by the restraint of notches 106 on lock lever 100 against tab 86. In this mode, the jaws are unable to return to a fully open state and the device achieves the static maintenance of a partially closed position. It will be appreciated that the number and location of trigger interface notches 106 may be varied to achieve a corresponding variety of partially closed positions of jaws 64 and 66. In the pictured embodiment, the notch 106 nearest to spring end of lock lever 100 corresponds to a fully closed position for jaws 64 and 66.

As can be seen in reference to FIG. 2, one embodiment of the present invention incorporates resilient portion 22 into rod 20. In the embodiment shown, the resilient portion 22 substantially resembles a helical tension spring. In the second mode of operation, wherein lock lever 100 is disposed to engage trigger tab 86, resilient portion 22 of rod 20 serves to provide a latent gripping force to jaws 64 and 66 when the user operates trigger 80 to the partially and fully closed positions. If, for instance, the user desires to grasp an object of a dimension narrower than that provided between pads 120 when jaws 64 and 66 are in a partially closed position, but wider than the distance between pads 120 when the jaws are in a fully closed position, the user would be unable to achieve a locking grip on an object so dimensioned with a device having a substantially inelastic rod 20. In the present embodiment, however, the user can achieve a locking grip on an object of the above-described dimensions due to the presence of resilient portion 22 in rod 20. When jaws 64 and 66 have fully contacted the object in question and are limited by that object from achieving a closer proximity, the user may continue to exert a force on trigger 80 and further displace it by effecting an elastic tensioning of the resilient portion 22. The user is thus able to displace tab 86 on trigger 80 to the next available trigger interface notch 106 on lock lever 100. When the trigger 80 is thus locked, resilient portion 22 continues to exert a tensile force within rod 20 allowing jaws 64 and 66 to maintain positive compression forces on the object in question. The user may release the grip achieved by the device simply by operating toggle arm 116 to move cam follower 110 from second cam seat 104 to the first cam seat 102. In this way, tab 86 on trigger 80 is freed from the restriction of trigger interface notches 106 on lock lever 100 and the jaws 64 and 66, rod 20, and trigger 80 are restored to the fully opened condition through the restorative force provided by spring 59 acting against stop 48 and boss 58.

Returning to FIGS. 4a and 4b, it will be appreciated that in one embodiment of the present invention the user may change the orientation of gripping assembly 40 with respect to central portion 12 and handle assembly 70. To achieve this result, the user simply draws the gripping assembly 40 away from central portion 12 and seating surface 14 as indicated by the arrow in FIG. 4b. The gripping assembly 40 is then free to rotate with respect to portion 12 and surface 14 to any one of a number of predetermined positions. More particularly, the rack 54 and lug 56, which both have fixed orientations in relation to the gripping assembly, are free to rotate relative to end-boss 52, which itself is fixed to the pull rod 20. When the user releases gripping assembly 40, the residual compression forces in spring 59 between boss 58 and stop 48 serve to urge gripping assembly 40 against surface 14. The recess portions 16 in surface 14 and the tabs 18 on grasping assembly housing 42 serve to further secure the seating of gripping assembly 40 against seating surface 14. This feature thus provides the user with an additional degree of dexterity in using the device.

A variety of materials may be used in constructing present invention. Except where otherwise indicated in this disclosure, the materials used for the pieces in the present embodiments are generally of a substantially rigid nature. Whether these materials be hardened plastic polymers or any of various substantially non-malleable metals is a matter of design choice and cost effectiveness.

While the invention has been described in connection with what is presently considered to be the most practical and preferred embodiments, the invention is not limited to those disclosed embodiments. To the contrary, the applicant intends that this disclosure cover various modifications and equivalent arrangements included within the spirit and scope of the appended claims, which scope is intended to be accorded the broadest interpretation so as to encompass all such modifications and equivalent structures as is permitted under the law.

The invention in which an exclusive property or privilege is claimed is defined as follows:

1. A hand-held device for gripping objects positioned beyond arm's length, comprising:
    a first pair of jaws movable relative to each other between an unclamped position and a fully clamped position;
    a handle spaced apart from said pair of jaws by a central portion, said handle including a trigger connected to said pair of jaws by a linkage, whereby actuation of said trigger is operative to selectively position said pair of jaws between the fully opened and fully closed positions thereof;
    wherein each of the pair of jaws includes a gripping portion freely removably connected thereto,
    wherein each of the pair of jaws includes an end effector having a bore in which the gripping portion is freely removably seated,
    wherein each of the gripping portions and bores are provided with complimentary male and female interlocking portions, whereby the gripping portions may each be securely freely removably seated in place within each of the bores, and
    wherein each gripping portion comprises an upper part having opposite gripping and seating surfaces, and a stem part extending axially from the upper part, the stem part including at least one radially extending tab, and wherein further each of the bores is dimensioned to receive therein the stem part, including the tab, each bore opening adjacent an upper surface opposing the seating surface of the gripping portion upper part, and each bore further communicating with a radiused slot dimensioned to receive therein the tab of the stem part to thereby permit rotational movement of the gripping portion relative to the jaw.

2. The hand-held device of claim 1, wherein the seating surface of each gripping portion includes at least one detent, and the upper surface of each of pair of jaws includes a complementary recess positioned at the limit of rotational movement of the gripping portion relative to the jaw.

3. In a hand-held device for gripping an object positioned beyond arm's length, the device including at least a pair of jaws for gripping an object therebetween, the at least pair of jaws movable relative to each other between a fully opened position and a fully closed position, a handle spaced apart from said at least pair of jaws by a central portion, said handle having a manually-actuatable trigger connected to said at least pair of jaws by a linkage operative to move said at least pair of jaws from the fully open to the fully closed positions thereof upon actuation of the trigger, and a locking mechanism selectively operable to lock said trigger into at least a first locked position thereof, and in which at least first locked position the at least pair of jaws define a first partially-closed position between the fully opened and fully closed positions, the improvement comprising:
    the linkage being a resilient linkage characterized in that the trigger can be moved into the at least first locked position thereof even when a gripped object prevents the at least pair of jaws from closing further towards the first partially closed position.

4. The hand-held device of claim 3, wherein the resilient linkage comprises a resilient pull rod.

5. The hand-held device of claim 4, wherein the resilient pull rod comprises a substantially inelastic pull rod including along the length thereof a resilient portion.

6. The hand-held device of claim 5, wherein the resilient portion of the pull rod comprises a spring.

7. The hand-held device of claim 6, wherein the pull rod is monolithic, and the spring is defined integrally therewith.

8. The hand-held device of claim 3, wherein the locking mechanism is selectively operable to lock said trigger into any of a plurality of locked positions thereof, and in each of which locked positions the at least pair of jaws define one of a plurality of partially closed positions between the fully opened and fully closed positions, and wherein the improvement further comprises the resilient linkage being characterized in that the trigger can be moved into at least one of the plurality of locked positions thereof even when a gripped object prevents the at least pair of jaws from closing further towards at least one of the partially closed positions thereof.

9. The hand-held device of claim 8, wherein the resilient linkage comprises a resilient pull rod.

10. The hand-held device of claim 9, wherein the resilient pull rod comprises a substantially inelastic pull rod including along the length thereof a resilient portion.

11. The hand-held device of claim 10, wherein the resilient portion of the pull rod comprises a spring.

12. The hand-held device of claim 11, wherein the pull rod is monolithic, and the spring is defined integrally therewith.

* * * * *